Patented Aug. 14, 1923.

1,465,115

UNITED STATES PATENT OFFICE.

FRANK CORDERY, OF TOLEDO, OHIO.

MANUFACTURE OF BUILDING BLOCKS AND BRICKS.

No Drawing.   Application filed March 3, 1921.   Serial No. 449,516.

*To all whom it may concern:*

Be it known that I, FRANK CORDERY, a citizen of the United States, residing at Toledo, in the county of Lucas and State of Ohio, have invented certain new and useful Improvements in the Manufacture of Building Blocks and Bricks, of which the following is a specification.

This invention relates to the manufacture of building blocks or bricks whose basic substance is slag, including iron oxide or colored earth, such as clinkers and cinders from iron furnaces or boilers, created by forced draft through the furnace or boiler and in which the said slag, in substantially pulverulent condition, is mixed with other substances and the mass, in plastic condition, is subjected to reduction to the desired shapes for building purposes.

Different processes have heretofore been employed for the manufacture of building blocks of the general character stated, all of which, so far as I am aware, are subject to more or less disadvantages, either in the process of making or in the formation of imperfect blocks whose final hardening is such that they become more or less brittle, subject to cracking and lacking the strength required for the uses to which they may be put.

In some of the processes heretofore used in the manufacture of building blocks of the kind stated, the cost of producing the product is high and the time needed in developing the finished product is long and the product is not of sufficient uniform hardness to meet the desired requirements.

Further, in some of the processes heretofore employed, the material is subjected to a heating action and after heating, lime is added to the preheated material or ingredients and the whole is subjected to further heating, usually by placing the preheated mass into a drum and subjecting it to high pressure steam charges as it is moved or agitated within the drum.

Such methods of forming blocks whose base is composed of pulverized cinders or clinkers from blast furnaces are more or less expensive.

The primary object of my invention is to provide a building block or brick of the general type stated, in the making of which the use of steam or other heating means is not necessary, the production of the block is much simpler and less expensive and the process steps of handling the substance, as it is developed to the desired building shapes, are less than has, so far as I know, been heretofore done.

Another object of my invention is to provide a building block of the kind stated that is practically waterproof, that will quickly assume the desired condition for use and will withstand greater compression than is found in the use of the usual types of cement and sand blocks.

With further objects in view that will hereinafter be apparent, my invention comprehends a building block embodying the composition of elements and the method of making the same as is fully explained in the following detailed description and as is specifically stated in the appended claims.

In the practical development of my method of making building blocks of the general type referred to, the basic substance of which the block is composed is clinkers and cinders (furnace slag) is reduced to a finely powdered condition and the substantially pulverized slag is mixed with Portland cement and the two substances stated are saturated with magnesium chloride mixed with water.

In practice, the magnesium chloride and water are mixed in the proportions of one gallon a saturated solution of magnesium chloride water to eight gallons of water. The cinders and clinkers are of equal proportions, preferably four to six to one of Portland cement, and the several ingredients, as a whole, are properly mixed and made plastic and in the plastic condition, the mixture is placed in molds.

When thus placed, the mixture is tamped or compressed in any approved manner to make the mass a solid body, which as it hardens, becomes of great strength and uniformly solid throughout.

The magnesium chloride diluted with water produces a chemical action on the Portland cement, which causes such cement to readily set and in a manner that causes the ingredients to assume a solid mass, which is practically waterproof.

My method of forming a plastic material adapted for being molded to the desired shapes as stated, when subjected to pressure and allowed to dry, produces a block for the purposes stated that will stand more compression than is possible in the standard types of cement and sand blocks.

It is to be noted that in my process of making the block, at no time is it necessary to subject the mixture to action of steam to complete the hardening process.

My method of making building blocks of the kind stated, differs, so far as I know, from the different methods of manufacturing similar blocks heretofore employed, in that, in my said method of making the blocks, the manufacture of the blocks is inexpensive, since it is not necessary to go through so many process steps. The blocks produced by my method being waterproof and no heating operations of any kind being necessary, the use of magnesium chloride, diluted with water, as stated, producing a chemical action on the cement, causes the mass to quickly and firmly set without in any manner rendering the product brittle or subject to cracking, chipping or splitting.

What I claim is:

1. The herein described method of manufacturing building blocks, comprising the mixture of pulverized slag and Portland cement with a saturated solution of magnesium chloride mixed with water in proportions of one gallon of dissolved magnesium chloride to eight gallons of water, the slag and the cement being proportioned from four to six parts of pulverized slag to one part of cement, and the whole reduced to plastic condition in shape for being molded and pressed.

2. As a new article, a building block composed of dried out pulverized slag, Portland cement and magnesium chloride.

FRANK CORDERY.